(12) United States Patent
Wang et al.

(10) Patent No.: US 9,401,928 B2
(45) Date of Patent: Jul. 26, 2016

(54) DATA STREAM SECURITY PROCESSING METHOD AND APPARATUS

(71) Applicant: Huawei Technologies Co., Ltd., Shenzhen (CN)

(72) Inventors: Donghui Wang, Beijjing (CN); Jinming Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/564,963

(22) Filed: Dec. 9, 2014

(65) Prior Publication Data

US 2015/0163243 A1 Jun. 11, 2015

(30) Foreign Application Priority Data

Dec. 9, 2013 (CN) .......................... 2013 1 0661766

(51) Int. Cl.
*H04L 9/32* (2006.01)
*H04L 29/06* (2006.01)
*H04L 12/715* (2013.01)
*H04L 12/721* (2013.01)

(52) U.S. Cl.
CPC .............. *H04L 63/16* (2013.01); *H04L 63/105* (2013.01); *H04L 65/60* (2013.01); *H04L 45/12* (2013.01); *H04L 45/123* (2013.01); *H04L 45/64* (2013.01); *H04L 63/164* (2013.01)

(58) Field of Classification Search
CPC ....... H04L 45/12; H04L 45/64; H04L 63/105; H04L 63/16; H04L 63/164; H04L 65/60

USPC .......................................................... 726/26
See application file for complete search history.

(56) References Cited

U.S. PATENT DOCUMENTS

| | | | | |
|---|---|---|---|---|
| 2006/0092841 A1* | 5/2006 | Lloyd | ................. | H04L 12/2602 370/231 |
| 2011/0202682 A1 | 8/2011 | Wu et al. | | |
| 2013/0125124 A1 | 5/2013 | Kempf et al. | | |

FOREIGN PATENT DOCUMENTS

WO    WO 2006029399 A2    3/2006

OTHER PUBLICATIONS

Zhang et al., "StEERING: A Software-Defined Networking for Inline Service Chaining," Institute of Electrical and Electronics Engineers, New York, New York (Oct. 7-10, 2013).

(Continued)

*Primary Examiner* — Baotran N To
(74) *Attorney, Agent, or Firm* — Leydig, Voit & Mayer, Ltd.

(57) ABSTRACT

Embodiments of the present invention provide a data stream security processing method and apparatus. In the embodiments of the present invention, security levels of data streams are determined according to different feature information of the data streams, and forwarding paths corresponding to the data streams are determined according to the security levels, where a forwarding path may go through a security device to implement a corresponding security function of the forwarding path, thereby improving data stream forwarding security and lightening load of a central controller.

12 Claims, 7 Drawing Sheets

(56) References Cited

OTHER PUBLICATIONS

Limoncelli, "OpenFlow: A Radical New Idea in Networking," ACM Queue, pp. 1-7, vol. 10, Issue 6, Association for Computing Machinery, New York, New York (Jun. 20, 2012).

Shin et al., "CloudWatcher: Network Security Monitoring Using OpenFlow in Dynamic Cloud Networks (or: How to Provide Security Monitoring as a Service in Clouds?)," 2012 20th IEEE International Conference on Network Protocols, pp. 1-6, Institute of Electrical and Electronics Engineers, New York, New York (Oct. 30-Nov. 2, 2012).

* cited by examiner

DATA STREAM SECURITY PROCESSING METHOD AND APPARATUS

CROSS-REFERENCE TO RELATED APPLICATION

This application claims priority to Chinese Patent Application No. 201310661766.X, filed on Dec. 9, 2013, which is hereby incorporated by reference in its entirety.

TECHNICAL FIELD

Embodiments of the present invention relate to communications technologies, and in particular, to a data stream security processing method and apparatus.

BACKGROUND

A software-defined network (SDN for short) is an emerging network architecture in which control and forwarding are separated. Two major devices in the SDN technology are a central controller (which is also referred to as a controller) and a network device.

On a basis of the SDN technology, in an existing data stream security processing method, a data stream first passes through a software module inside the controller to undergo security detection, and then the controller delivers a forwarding path that only goes through a forwarding device, that is the controller delivers information indicating a forwarding path that only goes through a forwarding device.

In the foregoing existing data stream security processing method, security performance of the security detection performed by the software module is not high. In addition, the controller not only needs to determine a transmission path for the data stream, but also needs to perform security detection on the data stream. As a result, load of the controller is heavy.

SUMMARY

Embodiments of the present invention provide a data stream security processing method and apparatus, so as to solve a problem in the prior art that security performance of security detection performed by a software module is not high and load is relatively heavy.

A first aspect of the present invention provides a data stream security processing method, including:

acquiring feature information of a data stream, where the feature information includes source information and destination information of the data stream;

determining a security level of the data stream according to the feature information;

determining, according to the security level, a forwarding path for transmitting the data stream; and delivering information used for indicating the forwarding path to devices in the forwarding path.

In a first possible implementation manner of the first aspect, the determining, according to the security level, a forwarding path for transmitting the data stream includes:

determining a corresponding path finding rule according to the security level; and determining, according to the path finding rule, the forwarding path for transmitting the data stream.

With reference to the first possible implementation manner of the first aspect, in a second possible implementation manner of the first aspect, the path finding rule is a shortest path finding rule; and the determining, according to the path finding rule, the forwarding path for transmitting the data stream includes:

determining, according to the shortest path finding rule, that a shortest path from a source node to a destination node is the forwarding path, where the shortest path does not go through a security device.

With reference to the first or second possible implementation manner of the first aspect, in a third possible implementation manner of the first aspect, the path finding rule is a shortest security path finding rule; and the determining, according to the path finding rule, the forwarding path for transmitting the data stream includes:

splitting a security node into split nodes according to a degree of the security node, where the security node is corresponding to the security device, and the number of the split nodes is equal to the number of the degrees;

acquiring paths from the source node to the split nodes;

acquiring paths from the destination node to the split nodes; and determining that the forwarding path for transmitting the data stream is a shortest path in paths that go through the same security node but different split nodes, where the paths are among the paths from the source node to the split nodes and the paths from the destination node to the split nodes.

With reference to the first or second possible implementation manner of the first aspect, in a fourth possible implementation manner of the first aspect, the path finding rule is a fastest detection path finding rule; and the determining, according to the path finding rule, the forwarding path for transmitting the data stream includes:

splitting a security node into split nodes according to a degree of the security node, where the security node is corresponding to the security device, and the number of the split nodes is equal to the number of the degrees;

acquiring a shortest path from the source node to the current split nodes;

acquiring a path from the destination node to another split node of the security node, where the another split node is a split node other than the current split node that the shortest path goes through; and determining the forwarding path for transmitting the data stream, where the forwarding path for transmitting the data stream is a path that the forwarding path first goes through the shortest path from the source node to the split nodes; then goes through the security device; and finally goes through the destination node to the another split node of the security node; that is the forwarding path for transmitting the data stream is a path that first goes through the shortest path from the source node to the split nodes, and then goes through the another split node of the security node to the destination node.

With reference to the first aspect, in a fifth possible implementation manner of the first aspect, the method further includes:

acquiring network topology information, where the network topology information is topology information of a network that includes a forwarding device and a security device, and the topology information includes security capability information of the security device; and the determining, according to the security level, a forwarding path for transmitting the data stream includes:

determining, according to the security level and the security capability information of the security device, the forwarding path for transmitting the data stream.

With reference to the fifth possible implementation manner of the first aspect, in a sixth possible implementation manner of the first aspect, the security capability information includes at least one piece of information in the following information:

security capability information of layers 2 to 3, and security capability information of layers 2 to 7.

A second aspect of the present invention provides a data stream security processing apparatus, including:

a feature acquiring module, configured to acquire feature information of a data stream, where the feature information includes source information and destination information of the data stream;

a level determining module, configured to determine a security level of the data stream according to the feature information;

a path determining module, configured to determine, according to the security level, a forwarding path for transmitting the data stream; and a path delivering module, configured to deliver information used for indicating the forwarding path to devices in the forwarding path.

In a first possible implementation manner of the second aspect, the level determining module is specifically configured to:

determine a corresponding path finding rule according to the security level; and determine, according to the path finding rule, the forwarding path for transmitting the data stream.

With reference to the first possible implementation manner of the second aspect, in a second possible implementation manner of the second aspect, the path finding rule is a shortest path finding rule; and the path determining module is specifically configured to:

determine, according to the shortest path finding rule, that a shortest path from a source node to a destination node is the forwarding path, where the shortest path does not go through a security device.

With reference to the first or second possible implementation manner of the second aspect, in a third possible implementation manner of the second aspect, the path finding rule is a shortest security path finding rule; and the path determining module is specifically configured to:

split a security node into split nodes according to a degree of the security node, where the security node is corresponding to the security device, and the number of the split nodes is equal to the number of the degrees;

acquire paths from the source node to the split nodes;

acquire paths from the destination node to the split nodes; and determine that the forwarding path for transmitting the data stream is a shortest path in paths that go through the same security node but different split nodes, where the paths are among the paths from the source node to the split nodes and the paths from the destination node to the split nodes.

With reference to the first or second possible implementation manner of the second aspect, in a fourth possible implementation manner of the second aspect, the path finding rule is a fastest detection path finding rule; and the path determining module is specifically configured to:

split a security node into split nodes according to a degree of the security node, where the security node is corresponding to the security device, and the number of the split nodes is equal to the number of the degrees;

acquire a shortest path from the source node to the current split nodes;

acquire a path from the destination node to another split node of the security node, where the another split node is a split node other than the current split node that the shortest path goes through; and determine the forwarding path for transmitting the data stream, where the forwarding path for transmitting the data stream is a path that the forwarding path first goes through the shortest path from the source node to the split nodes; then goes through the security device; and finally goes through the destination node to the another split node of the security node, that is, the forwarding path for transmitting the data stream is a path that first goes through the shortest path from the source node to the split nodes, and then goes through the another split node of the security node to the destination node.

With reference to the second aspect, in a fifth possible implementation manner of the second aspect, the apparatus further includes:

a topology acquiring module, configured to acquire network topology information, where the network topology information is topology information of a network that includes a forwarding device and a security device, and the topology information includes security capability information of the security device; and the path determining module is specifically configured to:

determine, according to the security level and the security capability information of the security device, the forwarding path for transmitting the data stream.

With reference to the fifth possible implementation manner of the second aspect, in a sixth possible implementation manner of the second aspect, the security capability information includes at least one piece of information in the following information:

security capability information of layers 2 to 3, and security capability information of layers 2 to 7.

The present invention provides a data stream security processing method and apparatus. In an existing data stream processing method, a data stream first passes through a software module inside a controller to undergo security detection, and then the controller delivers a forwarding path that only goes through a forwarding device, that is the controller delivers information indicating a forwarding path that only goes through a forwarding device. The data stream processing method of the present invention determines security levels of data streams according to different feature information of the data streams and determines, according to the security levels of the data streams, forwarding paths corresponding to the data streams. Compared with that a forwarding path goes through only a forwarding device but does not go through a security device in the prior art, a forwarding path determined in the embodiments of the present invention may probably go through a security device, because the data stream processing method of the present invention determines security levels of data streams according to different feature information of the data streams and determines, according to the security levels of the data streams, forwarding paths corresponding to the data streams. In this way, a forwarding path may go through a security device to implement a corresponding security function of the forwarding path, thereby improving data stream forwarding security and lightening load of a controller.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The following embodiments of the present invention are embodiments of a data stream security processing method and apparatus that are based on an SDN technology and an OpenFlow (OF for short) network. Network devices in the following embodiments of the present invention include a forwarding device and a security device. The security device may be a firewall, or may be a security device of an intrusion prevention system (Intrusion Prevention System, IPS for short) or an intrusion detection system (Intrusion Detection Systems, IDS for short) type; and the present invention sets no limitation herein. The forwarding device may be a switch, or may be a router; and the present invention sets no limitation herein.

Embodiment 1

Figure 1A:
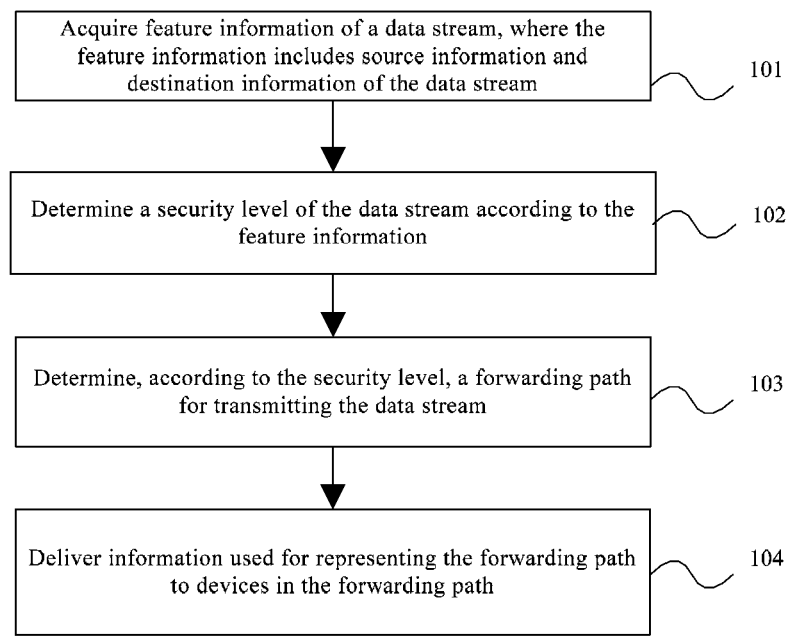
FIG. 1A is a flowchart of a data stream security processing method according to Embodiment 1 of the present invention.

FIG. 1A is a flowchart of a data stream security processing method according to Embodiment 1 of the present invention. As shown in FIG. 1A, the method specifically includes the following steps:

Step 101: Acquire feature information of a data stream, where the feature information includes source information and destination information of the data stream.

Step 102: Determine a security level of the data stream according to the feature information.

When a data stream needs to be forwarded, a controller may acquire feature information of the data stream and a link condition (such as a port congestion condition and a forwarding line rate) of a current network device, and determines the security level of the data stream by considering both the link condition and the feature information of the data stream. The present invention sets no limitation on the method for determining a security level.

Step 103: Determine, according to the security level, a forwarding path for transmitting the data stream.

Step 104: Deliver information used for indicating the forwarding path to devices in the forwarding path.

To be specific, when a data stream needs to be transferred in an OF network, a controller acquires feature information of the data stream, determines a security level of the data stream according to the feature information, determines, according to the security level corresponding to the data stream, a forwarding path for the data stream, and delivers determined information used for indicating the forwarding path to devices on the path, where different security levels may be corresponding to different forwarding paths, different forwarding paths go through a forwarding device or a security device in different manners, and the devices may include the forwarding device and the security device, or may include only the forwarding device.

The present invention provides a data stream security processing method. In an existing data stream processing method, a data stream first passes through a software module inside a controller to undergo security detection, and then the controller delivers a forwarding path that only goes through a forwarding device, that is the controller delivers information indicating a forwarding path that only goes through a forwarding device. The data stream processing method of the present invention determines security levels of data streams according to different feature information of the data streams and determines, according to the security levels of the data streams, forwarding paths corresponding to the data streams. Compared with that a forwarding path only goes through a forwarding device but does not go through a security device in the prior art, a forwarding path determined in this embodiment of the present invention may probably go through a security device, because the data stream processing method of the present invention determines security levels of data streams according to different feature information of the data streams and determines, according to the security levels of the data streams, forwarding paths corresponding to the data streams. In this way, a forwarding path may go through a security device to implement a corresponding security function of the forwarding path, thereby improving data stream forwarding security and lightening load of a controller.

Further, the foregoing embodiment may further include:

acquiring network topology information, where the network topology information is topology information of a network that includes a forwarding device and a security device, and the topology information includes security capability information of the security device.

Correspondingly, the foregoing step 103 may specifically be:

determining, according to the security level and the security capability information of the security device, the forwarding path for transmitting the data stream.

Optionally, the security capability information includes at least one piece of information in the following information:

security capability information of layers 2 to 3, and security capability information of layers 2 to 7.

To be specific, before determining a forwarding path for a data stream according to a security level of the data stream, a controller may acquire network topology information in the following three manners:

Manner one: acquiring by means of handshake-type message interaction. A network device in an OF network makes a request to the controller for establishing a connection. The two parties establish a Transmission Control Protocol (Transmission Control Protocol, TCP for short) connection. The network device may transfer a device identifier of the network device by using the TCP connection. At the same time, the controller and the network device may exchange information, such as a communications protocol version, between the two parties, and then select the communications protocol version to establish communication.

Manner two: acquiring by means of network device request-type message interaction. When status information of a network device in an OF network changes, the network device may actively report changed status information of the network device to a controller. The controller correspondingly changes network topology information according to the changed status information. The status information includes but is not limited to the following information: device status information, port status information, and security capability information. The security capability information includes but is not limited to the following two types of information: a data packet field that supports detection, such as Internet Protocol (IP for short) that supports data packet filtering, virtual local area network (Virtual Local Area Network, VLAN for short), the number of points per inch (Deep Packet Inspection, DPI for short); and an attack form that can be detected, such as a disk operating system (Disk Operating System, DOS for short) command and Address Resolution Protocol (ARP for short) fraud.

Manner three: acquiring by means of controller request-type message interaction. A controller may request and acquire status information from a network device in an OF network. The network device sends the corresponding status information to the controller. The controller correspondingly changes network topology information according to the received status information.

The foregoing three manners of network topology information acquiring manners may be performed at any moment before the controller in the OF network performs step 103. A network topology may be acquired by using one of the foregoing three manners or a combination of the three manners, which is not limited by the present invention.

Figure 1B:
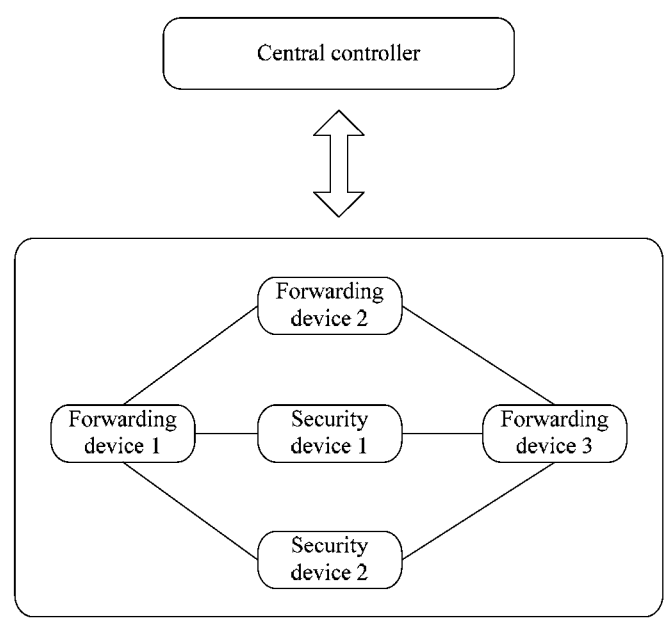
FIG. 1B is a schematic structural diagram of a forwarding network according to Embodiment 1 of the present invention.

For example, FIG. 1B is a schematic structural diagram of a forwarding network according to Embodiment 1 of the present invention. As shown in FIG. 1B, for example, a physical architecture of the OF network specifically includes three forwarding devices and two security devices. A connection manner of the three forwarding devices and the two security devices is shown in FIG. 1B. Before performing step 103, the controller may obtain a topology of the entire network by using the foregoing three manners. For example, specifically, the controller may first acquire, by applying the method of manner one, network topology information, that is, status information of and a connection relationship between the network devices (the forwarding devices and the security devices) shown in FIG. 1B, where one security device is corresponding to one security node and a forwarding device is corresponding to one forwarding node. When the status information of the network devices in the network changes, the controller may correspondingly change changed status information in the network topology information by applying manner two. In addition, the controller may also apply manner three to request and acquire the status information of the network devices in the network.

A controller is used to determine a forwarding path for a data stream after acquiring topology information of a network that includes a security device and a forwarding device, thereby improving security of data stream forwarding.

Further, determining, according to the security level, a forwarding path corresponding to the data stream, that is, step 103, may specifically include:

determining a corresponding path finding mechanism according to the security level; and determining, according to the path finding mechanism, the forwarding path for transmitting the data stream.

To be specific, after the controller determines the security level of the data stream that needs to be transferred in the network, the controller can determine a path finding mechanism corresponding to the security level, and determine the forwarding path for the data stream by using the path finding mechanism.

Different data streams are classified into different security levels, and different security levels correspond to different path finding mechanisms for determining a forwarding path. This implements that data streams go through different security devices or do not go through a security device according to different security levels, thereby improving data stream forwarding efficiency and security.

Embodiment 2

On a basis of Embodiment 1, Embodiment 2 describes in details how to determine different path finding mechanisms according to different security levels in Embodiment 1. In Embodiment 1, the path finding mechanisms may be a shortest path finding mechanism, a shortest security path finding mechanism, and a fastest detection path finding mechanism. Path finding mechanisms of the present invention are not limited to the foregoing three path finding mechanisms.

For example, determining a security level may specifically be the following two manners, but is not limited to the following two manners:

Manner one: classifying a security level according to a data stream source. For example, a security level is specifically classified according to reliability of a data stream source. Different security levels correspond to different path finding mechanisms. For example, specific classification conditions of security levels are described in Table 1.

TABLE 1

| Security level classification conditions in manner one | | |
|---|---|---|
| Reliability of data stream source | Security level | Corresponding path finding mechanism |
| High | Low | Shortest path finding mechanism |
| Medium | Medium | Shortest security path finding mechanism |
| Low | High | Fastest detection path finding mechanism |

Manner two: calculating feature information of a data stream according to a manner, and classifying a security level according to a calculation result. The feature information of the data stream may be source information and destination information of the data stream, which may specifically be a switch port at which a data packet arrives, a source Ethernet port, a source IP port, a VLAN tag, a destination Ethernet port or a destination IP port, and many other data packet characteristics. For example, the calculation manner may be that: Level_packet=(k1*Level_vlan ID+k2*Level_MAC)/2, where Level_packet is a level of a data stream, Level_vlan ID is a security level of a virtual network, Level_MAC is a level of a physical network interface card, and k1 and k2 are preset constants. Data stream feature values mentioned herein are not limited to the several exemplary feature values. To be more specific, in a SDN network, feature values that represent characteristics of the foregoing data stream can be acquired from a "match" field in an openflow message. Areas may be divided according to calculation results. Each area corresponds to a security level. Specific examples are described in Table 2, where a, b, c, and d are boundary values of calculation result areas. A calculation result of feature information of a data stream belongs to that area in Table 2, and a security level corresponding to the area is a security level of the data stream. For example, specifically, three security levels may be classified, as described in Table 2.

TABLE 2

Security level classification conditions in manner two

| Feature information area | Security level | Corresponding path finding mechanism |
|---|---|---|
| [a, b) | Low | Shortest path finding mechanism |
| [b, c) | Medium | Shortest security path finding mechanism |
| [c, d) | High | Fastest detection path finding mechanism |

Implementation manners of the foregoing three path finding mechanisms are as follows:

One: Shortest Path Finding Mechanism

Determining a forwarding path according to the shortest path finding mechanism includes: determining, according to the shortest path finding mechanism, that a shortest path from a source node to a destination node is the forwarding path, where the shortest path does not go through a security device.

To be specific, in a case in which a data stream, in an OF network, that needs to be transferred has a relatively low requirement on security assurance or has no security requirement, a security level of the data stream is relatively low, and the shortest path finding mechanism may be selected, according to the relatively low security level, to determine a forwarding path. An implementation process of the shortest path finding mechanism is: determining a shortest path from a source node to a destination node of the data stream that needs to be transferred, where the shortest path does not goes through a security device to improve a forwarding speed.

Two: Shortest Security Path Finding Mechanism

Figure 2A:
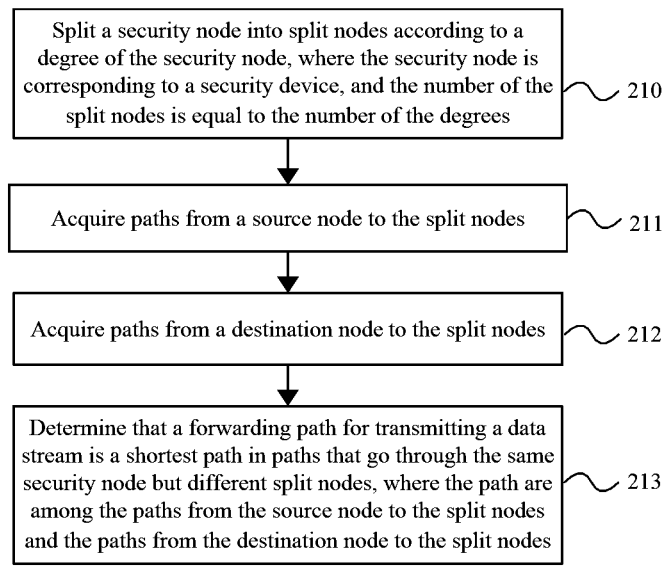
FIG. 2A is a flowchart of a shortest security path finding mechanism method according to Embodiment 2 of the present invention.

FIG. 2A is a flowchart of a shortest security path finding mechanism method according to Embodiment 2 of the present invention. As shown in FIG. 2A, determining a corresponding forwarding path according to the shortest security path finding mechanism specifically includes the following steps:

Step 210: Split a security node into split nodes according to a degree of the security node, where the security node is corresponding to a security device, and the number of the split nodes is equal to the number of the degrees.

Step 211: Acquire paths from a source node to the split nodes.

Step 212: Acquire paths from a destination node to the split nodes.

Step 213: Determine that a forwarding path for transmitting a data stream is a shortest path in paths that go through the same security node but different split nodes, where the paths are among the paths from the source node to the split nodes and the paths from the destination node to the split nodes.

To be specific, in a case in which a data stream, in an OF network, that needs to be transferred has a relatively high requirement on security assurance and forwarding speed, a security level of the data stream is relatively high, and the shortest security path finding mechanism may be selected, according to the relatively high security level, to determine a forwarding path. An implementation manner of the shortest security path finding mechanism is: splitting a security node corresponding to a security device into split nodes, where the number of the split nodes is equal to the number of degrees, and acquiring paths from the source node, which is corresponding to the data stream that needs to be transferred, to each split node, that is, step 211 is performed, where the "degree" is that a node may be connected to another node by using multiple links, and the number of links connected to the node is the number of degrees; and further, acquiring paths from the source node, which is corresponding to data that needs to be transferred, to each split node, that is, step 212 is performed. Steps 211 to 212 are performed for split nodes of each security node to determine the forwarding path corresponding to the data stream, where the forwarding path is a shortest path in paths that go through the same security node but different split nodes, where the paths are among the paths from the source node to the split nodes and the paths from the destination node to the split nodes.

Figure 2B:
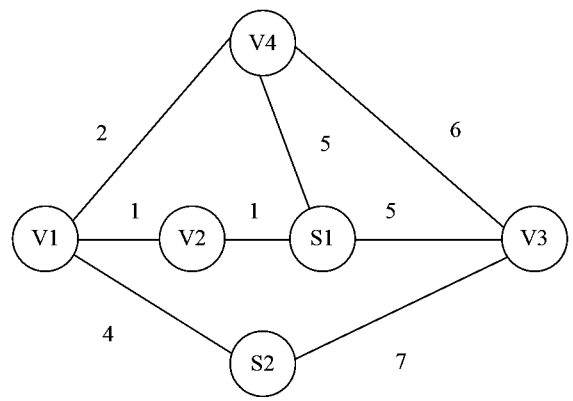
FIG. 2B is a schematic diagram of a network topology according to Embodiment 2 of the present invention.
Figure 2C:
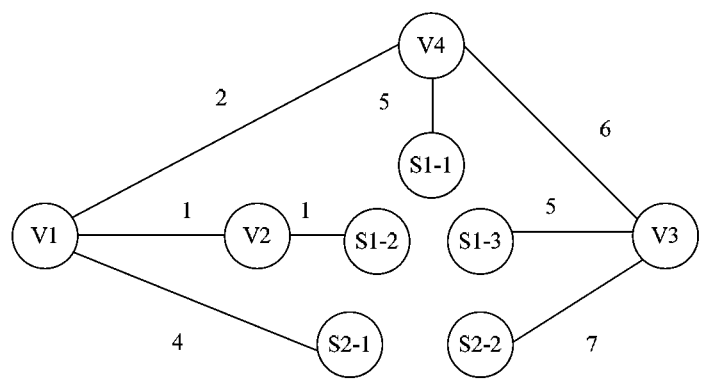
FIG. 2C is a schematic diagram of a topology of an entire network of security node splitting according to Embodiment 2 of the present invention.

For example, FIG. 2B is a schematic diagram of a network topology according to Embodiment 2 of the present invention, and FIG. 2C is a schematic diagram of a topology of the entire network of security node splitting according to Embodiment 2 of the present invention. As shown in FIG. 2B, for example, the topology of the entire network specifically includes four forwarding nodes V1 to V4, and two security nodes S1 and S2. A degree of the security node S1 is 3, and a degree of the security node S2 is 2. A weight value between a security node and a forwarding node represents a length of a path between two nodes. A greater weight value indicates that a longer length of a path, and a smaller weight value indicates a shorter length of a path. As shown in FIG. 2C, FIG. 2C is a schematic diagram of the topology of the entire network shown in FIG. 2B after security nodes in the topology of the entire network are split. The security node S1 is split into three split nodes according to the degree, and the security node S2 is split into two split nodes according to the degree.

For example, an algorithm process of the shortest security path finding mechanism in the topology of the entire network shown in FIG. 2B is specifically as follows:

Step 1: Perform topology reconstruction for the topology diagram shown in FIG. 2B, and split the security nodes according to degrees of the security nodes. A reconstructed topology is shown in FIG. 2C.

Step 2: In the new topology diagram, calculate, by using the Dijkstra's algorithm, a sum of weight values of a source point V1 to split nodes S1-1 to S1-3 respectively and a sum of weight values of the source point V1 to split nodes S2-1 and S2-2 respectively. a sum of weight values represents a length of a path. The following is obtained through calculation:

it is obtained that: V1→S1-1=7;
it is obtained that: V1→S1-2=2;
it is obtained that: V1→S1-3=13;
it is obtained that: V1→S2-1=4; and
it is obtained that: V1→S2-2=15.

Step 3: Calculate, by using the Dijkstra's algorithm, a sum of weight values of a source point V2 to split nodes S1-1 to S1-3 respectively and a sum of weight values of the source V2 to split nodes S2-1 and S2-2 respectively. The following is obtained through calculation:

it is obtained that: V2→S1-1=8;
it is obtained that: V2→S1-2=1;
it is obtained that: V2→S1-3=14;
it is obtained that: V2→S2-1=5; and
it is obtained that: V2→S2-2=16.

Step 4: Determine a final path for each security node.

For the security node S1: a result of two paths of V1 and V2 with a smallest sum and of different split nodes is that V1→S1-1=7 plus V2→S1-2=1. Therefore, the shortest length of a path that goes through S1 is 8.

For the security node S2, a result of two paths of V1 and V2 with a smaller sum and of different split nodes is that V1→S2-1=4 plus V2→S2-2=16. Therefore, the shortest length of a path that goes through S2 is 20.

Step 5: In the security nodes, select a path whose shortest length is the shortest as the final path, that is, the path is V1→V4→S1→V2. The algorithm ends.

The foregoing process calculates the shortest path from V1 to V2. A shortest path between any two points can be acquired through calculation by using a same method. A calculation process is as follows:

A sum of weight values from the node V1 to each split node:
it is obtained that: V1→S1-1=7;
it is obtained that: V1→S1-2=2;
it is obtained that: V1→S1-3=13;
it is obtained that: V1→S2-1=4; and
it is obtained that: V1→S2-2=1.

A sum of weight values from the node V2 to each split node:
it is obtained that: V2→S1-1=8;
it is obtained that: V2→S1-2=1;
it is obtained that: V2→S1-3=14;
it is obtained that: V2→S2-1=5; and
it is obtained that: V2→S2-2=16.

A sum of weight values from the node V3 to each split node:
it is obtained that: V3→S1-1=11;
it is obtained that: V3→S1-2=10;
it is obtained that: V3→S1-3=5;
it is obtained that: V3→S2-1=12; and
it is obtained that: V3→S2-2=7.

A sum of weight values from the node V4 to each split node:
it is obtained that: V4→S1-1=5;
it is obtained that: V4→S1-2=4;
it is obtained that: V4→S1-3=1;
it is obtained that: V4→S2-1=6; and
it is obtained that: V4→S2-2=13.

In summary, it can be acquired that a shortest path between any two points is as follows:

$$V1 \to V2: \min(V1 \to S1 \to V2) = V1 \to S1\text{-}1 + V2 \to S1\text{-}2 = 8;$$

$$\min(V1 \to S2 \to V2) = V1 \to S2\text{-}1 + V2 \to S2\text{-}2 = 20;$$

therefore, the length of a shortest path of V1→V2 is 8, and the path is V1→V4→S1→V2.

$$V1 \to V3: \min(V1 \to S1 \to V3) = V1 \to S1\text{-}2 + V3 \to S1\text{-}3 = 7;$$

$$\min(V1 \to S2 \to V3) = V1 \to S2\text{-}1 + V3 \to S2\text{-}2 = 11;$$

therefore, the length of a shortest path of V1→V3 is 7, and the path is V1→V2→S1→V3.

$$V1 \to V4: \min(V1 \to S1 \to V4) = V1 \to S1\text{-}2 + V4 \to S1\text{-}1 = 7;$$

$$\min(V1 \to S2 \to V4) = V1 \to S2\text{-}1 + V4 \to S2\text{-}2 = 17;$$

therefore, the length of a shortest path of V1→V4 is 7, and the path is V1→V2→S1→V4.

$$V2 \to V3: \min(V2 \to S1 \to V3) = V2 \to S1\text{-}2 + V3 \to S1\text{-}3 = 6;$$

$$\min(V2 \to S2 \to V3) = V2 \to S2\text{-}1 + V3 \to S2\text{-}2 = 12;$$

therefore, the length of a shortest path of V2→V3 is 6, and the path is V2→S1→V3.

$$V2 \to V4: \min(V2 \to S1 \to V4) = V2 \to S1\text{-}2 + V4 \to S1\text{-}1 = 6;$$

$$\min(V2 \to S2 \to V4) = V2 \to S2\text{-}1 + V4 \to S2\text{-}2 = 18;$$

therefore, the length of a shortest path of V2→V4 is 6, and the path is V2→S1→V4.

$$V3 \to V4: \min(V3 \to S1 \to V4) = V3 \to S1\text{-}3 + V4 \to S1\text{-}2 = 9;$$

$$\min(V3 \to S2 \to V4) = V3 \to S2\text{-}2 + V4 \to S2\text{-}1 = 13;$$

therefore, the length of a shortest path of V3→V4 is 9, and the path is V3→S1→V2→V1→V4.

The algorithm ends.

Three: Fastest Detection Path Finding Mechanism

Figure 2D:
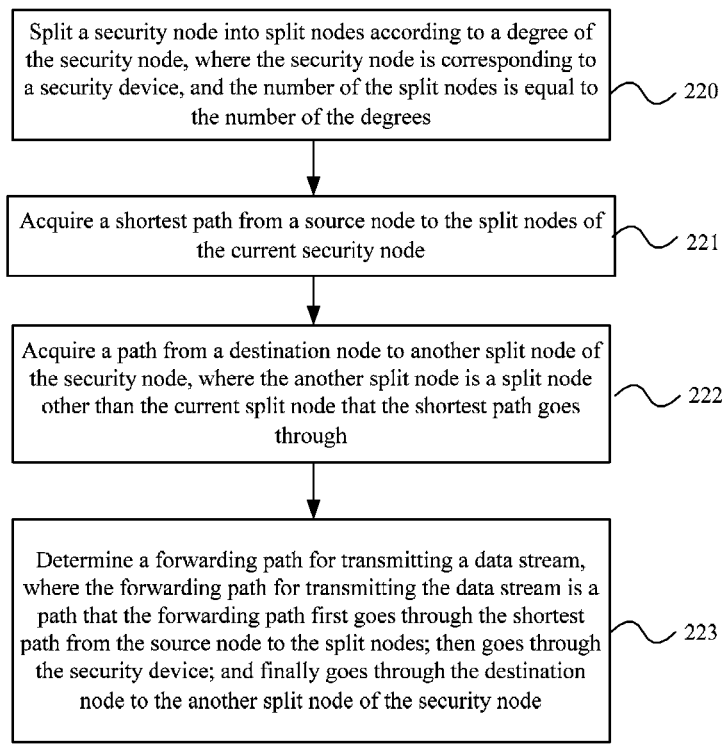
FIG. 2D is a flowchart of a fastest detection path finding mechanism method according to Embodiment 2 of the present invention.

FIG. 2D is a flowchart of a fastest detection path finding mechanism method according to Embodiment 2 of the present invention. As shown in FIG. 2D, determining a forwarding path according to the fastest detection path finding mechanism specifically includes the following steps:

Step 220: Split a security node into split nodes according to a degree of the security node, where the security node is corresponding to a security device, and the number of the split nodes is equal to the number of the degrees.

Step 221: Acquire a shortest path from a source node to current split nodes.

Step 222: Acquire a path from a destination node to another split node of the security node, where the another split node is a split node other than the split node that the shortest path goes through.

Step 223: Determine a forwarding path for transmitting a data stream, where the forwarding path for transmitting the data stream is a path that the forwarding path first goes through the shortest path from the source node to the split nodes; then goes through the security device; and finally goes through the destination node to the another split node of the security node, that is, the forwarding path for transmitting the data stream is a path that first goes through the shortest path from the source node to the split nodes, and then goes through the another split node of the security node to the destination node.

To be specific, when a data stream, in an OF network, that needs to be transferred has a relatively high danger coefficient or is from a tenant with a relatively low trustworthiness, a security level corresponding to the data stream is particularly high. Then the fastest detection path finding mechanism can be selected, according to the particularly high security level, to determine a forwarding path. An implementation manner of the fastest detection path finding mechanism is: splitting a security node corresponding to a security device into split nodes, where the number of the split nodes is equal to the number of degrees; acquiring paths from a source node, which is corresponding to the data stream that needs to be transferred, to each split node, and selecting a shortest path from the source node to the split nodes, that is, step 221 is performed; and acquiring a path from a destination node, of the data stream that needs to be transferred, to another split node in the security node through which the path selected in step 211 goes, where the another split node is a split node other than the split node through which the path selected in step 211 goes but belongs to the same security node with the split node through which the path selected in step 211 goes. A forwarding path, which is determined according to the fastest detection path finding mechanism, through which the data stream that needs to be transferred goes is a path that first goes through the shortest path from the source node corresponding to the data stream to all split nodes, and then goes through a security device corresponding to the split node, and finally goes through the destination node corresponding to the data stream to another split node of the security node, that is, the forwarding path for transmitting the data stream is a path that first goes through the shortest path from the source node to the split nodes, and then goes through the another split node of the security node to the destination node.

Different security levels correspond to different path finding mechanisms for determining a forwarding path. This implements that data streams go through different security devices or do not go through a security device according to different security levels, thereby improving data stream forwarding efficiency and security.

Embodiment 3

Figure 3:
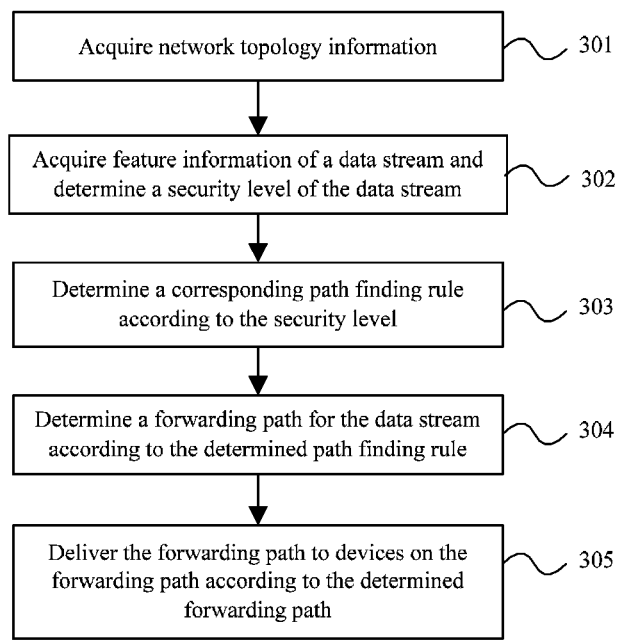
FIG. 3 is a flowchart of a data stream security processing method according to Embodiment 3 of the present invention.

Embodiment 3 combines Embodiment 1 and Embodiment 2 and describes a data stream security processing method in detail. FIG. 3 is a flowchart of the data stream security processing method according to Embodiment 3 of the present invention. As shown in FIG. 3, the method specifically includes the following steps:

Step 301: Acquire network topology information.

The network topology information includes status information of a security device and that of a forwarding device, and a connection relationship between the security device and the forwarding device. At the same time, security capability information of the security device may also be acquired. The security capability information includes security capability information of layers 2 to 3 and security capability information of layers 2 to 7.

Step 302: Acquire feature information of a data stream and determine a security level of the data stream.

Step 303: Determine a corresponding path finding mechanism according to the security level.

Step 304: Determine a forwarding path for the data stream according to the determined path finding mechanism.

Step 305: Deliver the forwarding path to devices on the forwarding path according to the determined forwarding path.

Acquiring network topology information in step 301 is a dynamic process, that is, in a network, when the status information of the security device or that of the forwarding device changes or the security capability information of the security device changes, a controller updates synchronously. An updating method can be the three manners in Embodiment 1, which is not described repeatedly herein.

In the data stream security processing method of this embodiment, topology information of a network that includes a forwarding device and a security device is acquired, security levels of data streams are determined according to feature information of the data streams; and different path finding mechanisms are selected, according to the security levels of the data streams, to determine forwarding paths for the data streams, thereby lightening load of a controller and improving data stream forwarding security.

Embodiment 4

Figure 4:
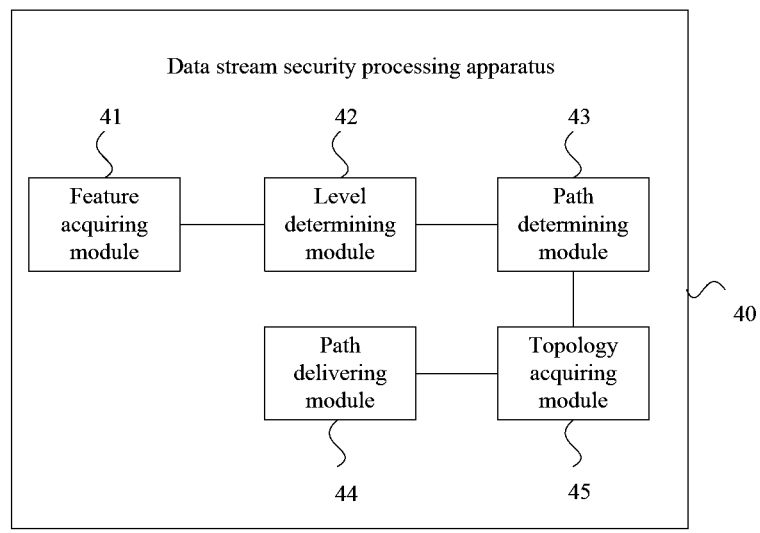
FIG. 4 is a schematic structural diagram of a data stream security processing apparatus according to Embodiment 4 of the present invention.

FIG. 4 is a schematic structural diagram of a data stream security processing apparatus according to Embodiment 4 of the present invention. As shown in FIG. 4, the data stream security processing apparatus 40 of this embodiment includes: a feature acquiring module 41, a level determining module 42, a path determining module 43, and a path delivering module 44. The feature acquiring module 41 is configured to acquire feature information of a data stream, where the feature information includes source information and destination information of the data stream. The level determining module 42 is configured to determine a security level of the data stream according to the feature information. The path determining module 43 is configured to determine, according to the security level, a forwarding path for transmitting the data stream. The path delivering module 44 is configured to deliver information used for indicating the forwarding path to devices in the forwarding path.

Further, the level determining module 42 is specifically configured to:

determine a corresponding path finding rule according to the security level; and determine, according to the path finding rule, the forwarding path for transmitting the data stream.

Further, the path finding rule is a shortest path finding rule.

Correspondingly, the path determining module 43 is specifically configured to:

determine, according to the shortest path finding rule, that a shortest path from a source node to a destination node is the forwarding path, where the shortest path does not go through a security device.

Further, the path finding rule is a shortest security path finding rule.

Correspondingly, the path determining module 43 is specifically configured to:

split a security node into split nodes according to a degree of the security node, where the security node is corresponding to the security device, and the number of the split nodes is equal to the number of the degrees;

acquire paths from the source node to the split nodes;

acquire paths from the destination node to the split nodes; and determine that the forwarding path for transmitting the data stream is a shortest path in paths that go through the same security node but different split nodes, where the paths are among the paths from the source node to the split nodes and the paths from the destination node to the split nodes.

Alternatively, the path finding rule is a fastest detection path finding rule.

Correspondingly, the path determining module 43 is specifically configured to:

split a security node into split nodes according to a degree of the security node, where the security node is corresponding to the security device, and the number of the split nodes is equal to the number of the degrees;

acquire a shortest path from the source node to the current split nodes;

acquire a path from the destination node to another split node of the security node, where the another split node is a split node other than the current split node that the shortest path goes through; and determine the forwarding path for transmitting the data stream, where the forwarding path for transmitting the data stream is a path that the forwarding path first goes through the shortest path from the source node to the split nodes; then goes through the security device; and finally goes through the destination node to the another split node of the security node, that is, the forwarding path for transmitting the data stream is a path that first goes through the shortest path from the source node to the split nodes, and then goes through the another split node of the security node to the destination node.

In addition, the data stream security processing apparatus 40 of the embodiment may also include: a topology acquiring module 45, which is configured to acquire network topology information. The network topology information is topology information of a network that includes a forwarding device and the security device. The topology information includes security capability information of the security device. Correspondingly, the path determining module 43 is specifically configured to determine, according to the security level and the security capability information of the security device, the forwarding path for transmitting the data stream.

Preferably, the security capability information includes at least one piece of information in the following information: security capability information of layers 2 to 3, and security capability information of layers 2 to 7.

The data stream security processing apparatus of this embodiment can be used to execute the technical solutions in the method embodiments of Embodiment 1, Embodiment 2, and Embodiment 3. The implementation principles and technical effects are similar, and are not described repeatedly herein. For details, refer to the related descriptions in the embodiments.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data stream security processing method, comprising:
   acquiring, by a controller, feature information of a data stream, wherein the feature information comprises source information and destination information of the data stream;
   determining, by the controller, a security level of the data stream according to the feature information;
   determining a shortest security path finding rule according to the security level;
   splitting a security node into split nodes according to degrees of the security node, wherein the security node is associated with a security device, and a quantity of the split nodes is equal to a quantity of the degrees of the security node;
   acquiring paths from a source node to the split nodes;
   acquiring paths from a destination node to the split nodes;
   determining, according to the shortest security path finding rule, a forwarding path for transmitting the data stream, wherein the forwarding path is a shortest path in paths that go through a same security node but different split nodes, wherein the paths are among the paths from the source node to the split nodes and the paths from the destination node to the split nodes; and
   delivering, by the controller, information which indicates the forwarding path to devices in the forwarding path.

2. The method according to claim 1, further comprising:
   acquiring, by the controller, network topology information, wherein the network topology information is topology information of a network that comprises a forwarding device and the security device, and the topology information comprises security capability information of the security device; and
   wherein determining the forwarding path for transmitting the data stream comprises:
   determining, according to the security level and the security capability information of the security device, the forwarding path for transmitting the data stream.

3. The method according to claim 2, wherein the security capability information comprises at least one piece of information in the following information:
   security capability information of layers 2 to 3, and security capability information of layers 2 to 7.

4. A controller for processing data stream security, comprising:
   a microprocessor; and
   a plurality of modules including a feature acquiring module, a level determining module, a path determining module, and a path delivering module as codes embodied within the controller and executed by the microprocessor of the controller, wherein the plurality of modules causes the microprocessor to perform respective functions, which comprise:
   the feature acquiring module, configured to acquire feature information of a data stream, wherein the feature information comprises source information and destination information of the data stream;
   the level determining module, configured to determine a shortest security path finding rule according to the security level; and
   the path determining module, configured to:
      split a security node into split nodes according to degrees of the security node, wherein the security node is associated with a security device, and a quantity of the split nodes is equal to a quantity of the degrees of the security node;
      acquire paths from a source node to the split nodes;
      acquire paths from a destination node to the split nodes; and
      determine, according to the shortest security path finding rule, a forwarding path for transmitting the data stream, wherein the forwarding path is a shortest path in paths that go through a same security node but different split nodes, wherein the paths are among the paths from the source node to the split nodes and the paths from the destination node to the split nodes; and
   the path delivering module, configured to deliver information which indicates the forwarding path to devices in the forwarding path.

5. The controller according to claim 4, further comprising:
   a topology acquiring module, configured to acquire network topology information, wherein the network topology information is topology information of a network that comprises a forwarding device and the security device, and the topology information comprises security capability information of the security device; and
   the path determining module is configured to:
   determine, according to the security level and the security capability information of the security device, the forwarding path for transmitting the data stream.

6. The controller according to claim 5, wherein the security capability information comprises at least one piece of information in the following information:
   security capability information of layers 2 to 3, and security capability information of layers 2 to 7.

7. A data stream security processing method, comprising:
   acquiring feature information of a data stream, wherein the feature information comprises source information and destination information of the data stream;
   determining a security level of the data stream according to the feature information;
   determining a fastest detection path finding rule according to the security level;
   splitting a security node into split nodes according to degrees of the security node, wherein the security node is associated with a security device, and a quantity of the split nodes is equal to a quantity of the degrees of the security node;
   acquiring a shortest path from a source node to the split nodes of the security node;

acquiring a path from a destination node to another split node of the security node, wherein the another split node is one of the split nodes which is not located on the shortest path; and determining, according to the fastest detection path finding rule, a forwarding path for transmitting the data stream, wherein the forwarding path for transmitting the data stream is a path that first goes through the shortest path from the source node to the split nodes, and then goes through the another split node of the security node to the destination node; and delivering information which indicates the forwarding path to devices in the forwarding path.

8. The method according to claim 7, further comprising:

acquiring network topology information, wherein the network topology information is topology information of a network that comprises a forwarding device and the security device, and the topology information comprises security capability information of the security device; and wherein the determining the forwarding path for transmitting the data stream comprises:

determining, according to the security level and the security capability information of the security device, the forwarding path for transmitting the data stream.

9. The method according to claim 8, wherein the security capability information comprises at least one piece of information in the following information:

security capability information of layers 2 to 3, and security capability information of layers 2 to 7.

10. A controller for processing data stream security apparatus, comprising:

a microprocessor; and a plurality of modules including a feature acquiring module, a level determining module, a path determining module, and a path delivering module as codes embodied within the controller and executed by the microprocessor of the controller, wherein the plurality of modules causes the microprocessor to perform respective functions, which comprise:

the feature acquiring module, configured to acquire feature information of a data stream, wherein the feature information comprises source information and destination information of the data stream;

the level determining module, configured to determine a fastest detection path finding rule according to the security level;

the path determining module, configured to:

split a security node into split nodes according to degrees of the security node, wherein the security node is associated with a security device, and a quantity of the split nodes is equal to a quantity of the degrees of the security node;

acquire a shortest path from a source node to the split nodes;

acquire a path from a destination node to another split node of the security node, wherein the another split node is one of the split nodes which is not located on the shortest path; and determine, according to the fastest detection path finding rule, a forwarding path for transmitting the data stream, wherein the forwarding path for transmitting the data stream is a path that first goes through the shortest path from the source node to the split nodes, and then goes through the another split node of the security node to the destination node; and the path delivering module, configured to deliver information which indicates the forwarding path to devices in the forwarding path.

11. The controller according to claim 10, further comprising:

a topology acquiring module, configured to acquire network topology information, wherein the network topology information is topology information of a network that comprises a forwarding device and the security device, and the topology information comprises security capability information of the security device; and the path determining module is specifically configured to:

determine, according to the security level and the security capability information of the security device, the forwarding path for transmitting the data stream.

12. The controller according to claim 11, wherein the security capability information comprises at least one piece of information in the following information:

security capability information of layers 2 to 3, and security capability information of layers 2 to 7.

* * * * *